Aug. 1, 1950
O. A. CLARK
2,516,957
POTATO DIGGER
Filed March 3, 1947
2 Sheets-Sheet 1
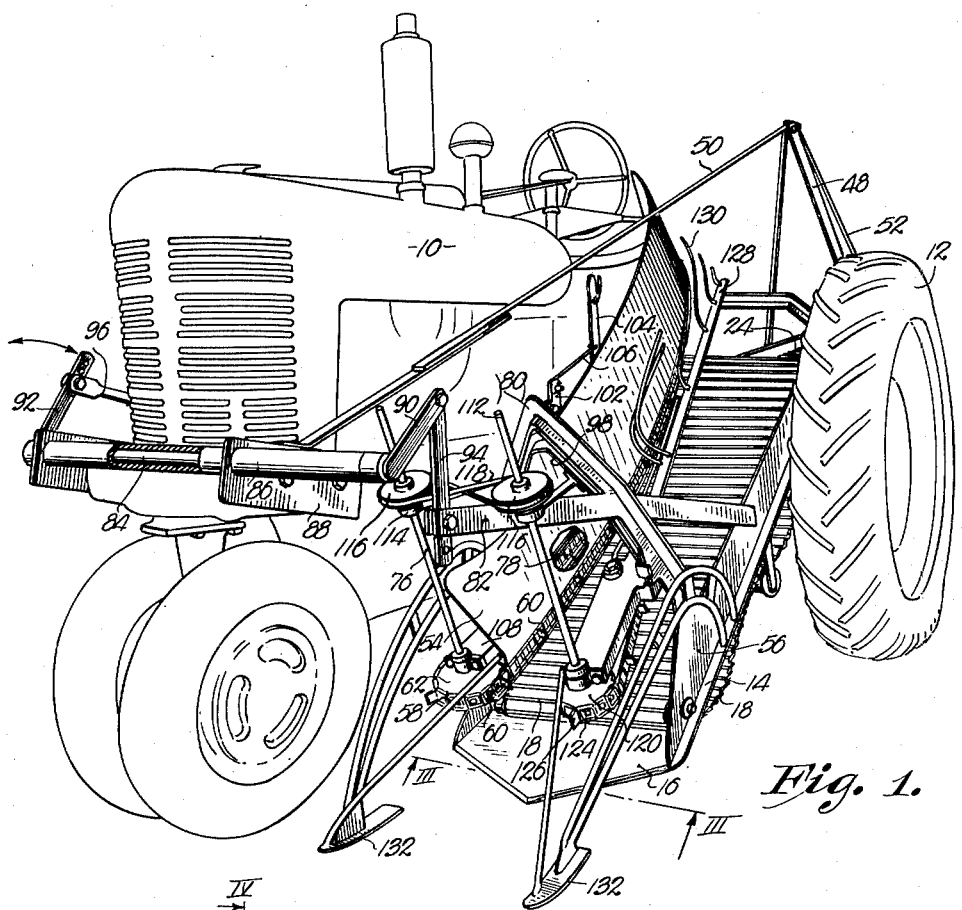
Fig. 1.
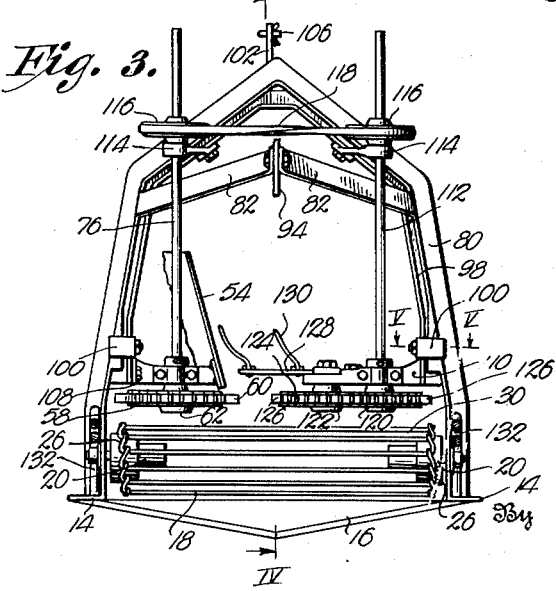
Fig. 3.
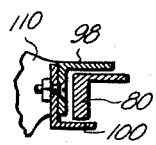
Fig. 5.
Inventor
Otho Clark Inventor
Otho Clark Patented Aug. 1, 1950

2,516,957

UNITED STATES PATENT OFFICE 2,516,957

POTATO DIGGER

Otho A. Clark, Atherton, Mo.

Application March 3, 1947, Serial No. 732,068

7 Claims. (Cl. 55—51)

This invention relates to agricultural implements and more particularly to potato diggers of the kind particularly adapted for mounting upon and operation by a tractor, not only by reason of its being motivated over the field of potatoes to be harvested but by receiving power directly from the power take-off of the tractor as well as the power lift thereof.

The most important object of this invention is to provide a potato digger having a specially designed conveyor for elevating the dug potatoes to a point of discharge into a container therefor, which conveyor automatically removes virtually all dirt and other matter clinging to said potatoes and additionally to provide unique means for removing the potato vines from such dug potatoes as the latter move along said conveyor and prior to the discharge of the same into said container.

Another important object of this invention is to provide a potato digger having the aforesaid conveyor means and an assembly cooperable with the conveyor for moving the vines which necessarily cling to and move therealong provided with a number of resilient arms disposed to bear against said vines and press the same against an elongated panel coextensive with the conveyor to the end that the vines are retarded in their path of movement and the potatoes removed therefrom as the same are caused to continue movement along said conveyor.

A still further object of this invention is to provide a potato digger having unique digging means as a part thereof associated directly with the above described conveyor and taking the form of a sharp share which digging means and conveyor, as well as the aforesaid vine removing assembly, are all mounted as a unitary structure upon a swingable frame operated by the power lift of the tractor whereby the depth at which said share digs into the ground containing the potatoes is rendered selective.

One of the most difficult problems in this field, in addition to providing positive and effective means for removing vines from potatoes prior to their being transported into suitable containers, is to compensate for different types of soil and particularly that which tends to move into the digger in large lumps or clods and thereby causing clogging or damage to the operating mechanism therefor and oftentimes causing great delays in the harvesting operation.

It is one of the primary objects of this invention therefore, to provide a potato digger having the vine removing assembly and the conveyor and digging means all mounted on a unitary frame and to provide means for selectively moving the vine removing assembly toward and away from the conveyor as necessitated by conditions, all to the end that a smooth operating implement is provided for obviating virtually all of the troublesome disadvantages inherent in potato diggers now in common use.

Other objects are minor but important and the same will be made clear as the following specification progresses, reference being had to the accompanying drawings, wherein:

Fig. 1 is a front perspective view of the potato digger made in accordance with my present invention and showing the same in operative attachment to a tractor.

Fig. 3 is a fragmentary detailed view partially in section taken on line III—III of Fig. 1 and looking in the direction of the arrows.

Fig. 5 is an enlarged detailed sectional view taken on line V—V of Fig. 3.

Figure 2:
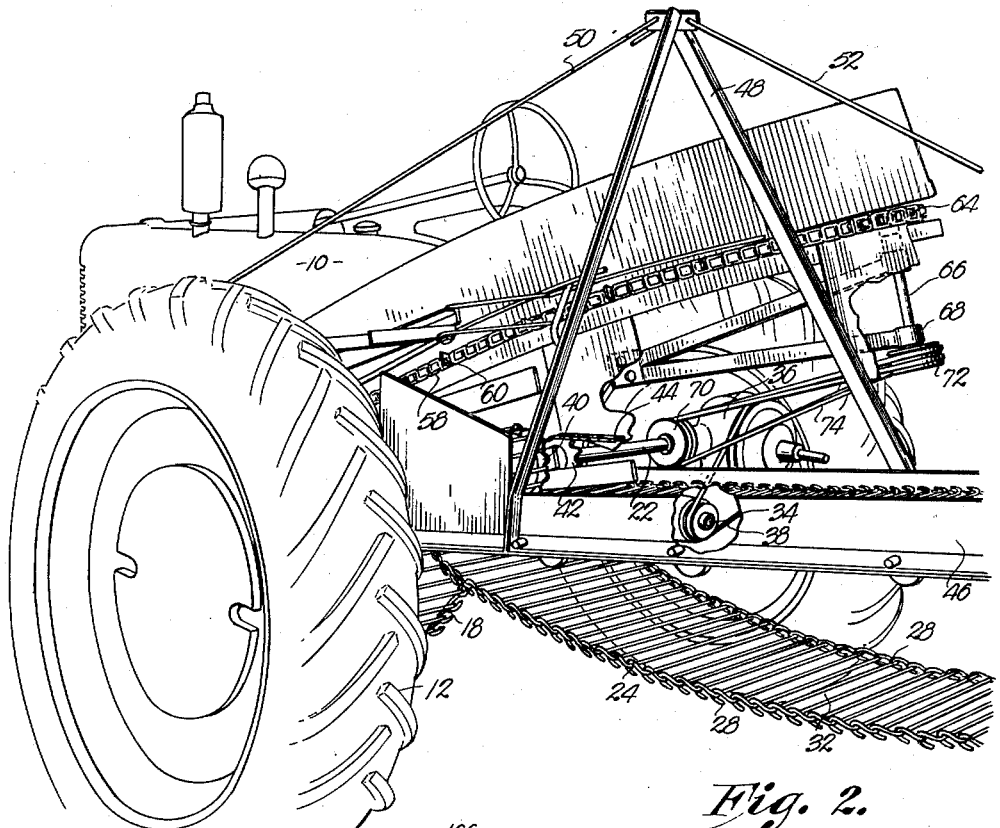
Fig. 2 is a rear perspective view thereof.
Figure 4:
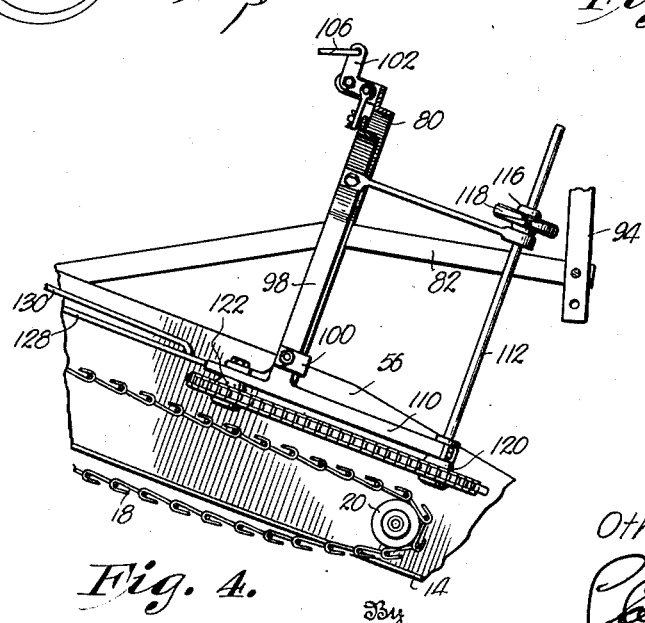
Fig. 4 is a fragmentary cross sectional view taken on line IV—IV of Fig. 3.

The tractor shown in Figs. 1 and 2 of the drawings obviously is for illustrative purposes only and it is contemplated that any of many different types of tractors may be used, provided only that the same has a power take-off and a power lift of one of the many types commonly employed.

This tractor broadly designated by the numeral 10 is of the commonly called "row-crop" type of tractor to the end that the rear wheels 12 may be extended upon their axis to the condition shown in the drawings, whereby the entire potato digger assembly may be interposed between one of wheels 12 and the body of tractor 10 and swingably mounted on the rear axle thereof.

The potato digger per se includes a frame 14 which is swingably mounted on the rear axle of tractor 10 in any suitable manner (not shown) to the end that the digging blade or share 16 may be raised and lowered in a manner hereinafter more fully set down. Frame 14 carries a continuous web-like conveyor 18 which extends the entire length of frame 14 and passes around a pair of idlers 20 mounted in spaced relation at the lowermost end of frame 14 and this conveyor 18 passes upwardly and around a shaft 22 at the uppermost end of this frame 14. In other words, frame 14 and the conveyor 18 carried thereby are normally disposed at an inclined angle and the potatoes dug by the share 16 are elevated upwardly for deposit on a secondary conveyor 24 which extends rearwardly of tractor 10. Each of these conveyors 18 and 24 is formed substantially identical and comprise a plurality of spaced apart links 30 and 32 respectively. These links are interconnected through the medium of loops 24 and 26 respectively formed in each end thereof as is clear in the drawings. Such construction of these web conveyors 18 and 24 permit any dirt and clods of dirt to fall from the potatoes being elevated thereby prior to movement of the potatoes into a container (not shown) at the free end of the conveyor 24.

The means for operation of both conveyors 18 and 24 is through the power take-off 34 of the tractor 10. This power take-off 34 drives a reducer 36 by means of a belt 38, which reducer 36 in turn is operably attached to the shaft 22. This shaft 22 has a pair of sprockets 40 near each side of the conveyor 18 over which the links 30 thereof pass and a sprocket 42 on the shaft 22 is operably connected to the conveyor 24 by a chain 44 in any suitable manner.

The precise construction of the frame 46 supporting the conveyor 24 and the way in which the same is driven by shaft 22 and its sprocket 42, forms no part of this invention and therefore, it is not necessary to further explain the same. It is suffice to point out that this frame 46 is supported on the tractor 10 through the medium of a frame 48 extending upwardly therefrom and a pair of tie rods 50 and 52 joined to tractor 10 and the outermost free end of frame 46 respectively.

A pair of spaced apart up-standing panels 54 and 56 are mounted upon the frame 14 and are co-extensive with the conveyor 18. The panel 54 is substantially arcuate and extends laterally to one side and rearwardly of the uppermost end of the conveyor 18 and a continuous chain 58 extends along this panel 54 throughout the entire length thereof and near the lowermost edge thereof. This chain 58 has a plurality of spaced apart fingers 60 thereon and passes around a pair of sprockets 62 and 64 at the lowermost and upper ends thereof respectively. Sprocket 64 is secured to a vertical shaft 66 mounted upon a bracket 68 extending rearwardly from tractor 10 and is driven by a pair of pulleys 70 and 72 on shaft 22 and the lowermost end of shaft 66 respectively through the medium of an interconnecting belt 74. Sprocket wheel 62 is likewise secured to a rotatable shaft 76 mounted in a manner hereinafter more fully described. Obviously, this continuous chain 58 travels in the same direction as the conveyor 18 and as the same passes around the back side of panel 54, a channel-like guide 78 holds the same against interference with parts of the tractor 10.

A V-shaped yoke member 80 extends upwardly from the frame 14 near the normally forward end thereof and a pair of arms 82 fixed to this yoke member 80 extend forwardly and upwardly therefrom to join with the power lift assembly about to be described. This assembly comprises a shaft 84 extending across the front end of tractor 10 and pivotally mounted in a sleeve 86 held in place by brackets 88 secured to the tractor 10. A pair of links 90 and 92 fixed to each end of the shaft 48 provide means for interconnecting this shaft 84 with the arms 82 and the tractor power lift respectively. A link 94 pivotally secured at each end thereof to the free end of link 90 and the free ends of arms 82 respectively and a rod 96 having one end thereof pivotally mounted on the free end of link 92 and the opposite end thereof joined to the power lift mechanism of tractor 10 (not shown), complete the lifting or raising and lowering means for the lowermost swingable end of the entire structure including frame 14 and the conveyor 18.

The power lift of tractor 10 is of the well known "Hydralic" type or the like commonly understood by those experienced in this field and therefore, the same has not been shown nor is it necessary to further describe its operation. Movement of the link 92 by rod 96 to swing in the manner indicated by the arrows illustrated in Fig. 1, obviously raises and lowers the frame 14 and all of its component parts through the arms 82 and yoke 84 as link 94 moves in a substantially vertical arcuate path of travel.

A second yoke-like member 98 substantially complementary in form to the yoke 80 is disposed for sliding movement within this yoke 80 as clearly illustrated in Fig. 3 and is guided through its substantially vertical path of travel within the yoke 80 in the manner shown by Fig. 5 of the drawings. This Fig. 5 clearly illustrates that each of the yokes 80 and 98 is L-shaped in cross sectional contour and one of the legs of yoke 98 is disposed in overlapping relation with a parallel disposed leg of the yoke 80. The other leg of yoke 98 has an L-shaped bracket 100 fixed thereto and in overlapping relation with the yoke 80. There are two of these brackets 100 as illustrated in Fig. 3 disposed near the lowermost free ends of the yoke 98.

The means for raising and lowering of yoke 98 within the outermost yoke 80 comprises a trigger 102 pivotally secured to yoke 98 at the uppermost end thereof and joined to an operating lever 104 through the medium of an interconnecting rod 106. Extending laterally and forwardly from one of the free ends of yoke 98 is a bracket 108 for rotatably supporting the vertical shaft 76 and the lowermost end of the arcuate panel 54. The other free end of the yoke member 98 has a bracket 110 similar to the bracket 108 and extending laterally and forwardly therefrom for rotatably mounting another vertical shaft 112 at one end thereof remote from yoke 98. The uppermost ends of these shafts 76 and 112 are each supported by laterally extending arms 114 having one end thereof secured to and movable with the yoke 98. This shaft 112 is driven by means of a pair of pulleys 116 on the shafts 76 and 112, which pulleys 116 are operably interconnected by a V-belt or the like 118. The lowermost end of the shaft 112 has a sprocket 120 fixed thereon and an idler sprocket 122 rotatably mounted on the bracket 110 in spaced relation to this sprocket 120, receives a short continuous chain 124, which chain in turn passes around sprocket 120 and has a number of laterally projecting spaced apart fingers 126 thereon.

Extending upwardly and rearwardly from the normally innermost end of the bracket 110 is an elongated member 128 substantially co-extensive with the panel 54 and extending a distance beyond the uppermost end of the conveyor 18, which member 128 has a plurality of curved laterally projecting resilient arms 130 mounted thereon. The sprockets 62 and 120 and the chains 58 and 124 respectively are, therefore, in spaced apart relation and the bracket 110 is disposed at an angle to the end that short chain 124 converges toward the chain 58 as the uppermost end thereof is approached. Similarly, the member 128 and the arms 130 carried thereby progressively approach the panel 54 and the chain 58 immediately therebelow as the uppermost ends of panel 54 and member 128 are approached.

The digging plate or share 16 on frame 14 is substantially triangular shaped with one point thereof on a central line with respect to conveyor 18 and these edges which diverge from this forward point are sharpened in the usual manner. Share 16 has a length which extends entirely across the lowermost forward end of the conveyor 18. Spaced apart fingers 132 extend forwardly and are mounted upon the frame 14 to serve as a means for guiding the potato vines between the chains 58 and 124 as the entire assembly is placed into operation.

Assuming all the component parts of the potato digger to be formed and assembled as above set forth, the operation is as follows:

As tractor 10 is caused to move forwardly, the operator thereof, through the medium of the power lift mechanism of tractor 10, lowers the digging share 16 to the desired depth. This action takes place upon rotative motion of the shaft 84 and consequent lowering of the yoke 80 and the frame 14 carried thereby as this frame swings on its supporting means and connection with the rear axle of tractor 10.

It is notable that all of the above described parts, including the vine removing mechanism formed by chains 58 and 124, as well as the arms 130, move with the frame 14 throughout its vertical swinging movement. As the power take-off 34 of tractor 10 is placed into operation to drive the shaft 22, both conveyor 18 and the conveyor 24 are caused to move in a direction toward the rear of tractor 10, the chain 58 is driven through the medium of its drive shaft 66 and the short chain 124 is caused to move in the same direction as chain 58 and the conveyors 18 and 24 because of the belt 118 being twisted in the manner illustrated in Fig. 1 of the drawings. As the digging blade 16 moves forwardly beneath the surface of the ground and below the potatoes to be dug, these potatoes, the vines attached thereto and a large portion of the dirt surrounding the same, will move on to conveyor 18 for elevation toward the rearmost end of tractor 10. The vines of the potatoes will be caused to move in this same direction because of the action of the fingers 60 and 126 of chains 58 and 124 respectively, and as these vines come into contact with the resilient arms 130, they will be pressed tightly against chain 58 and the panel member 54, causing their advance to be slightly retarded.

As this action takes place, the potatoes which are clinging to these vines and being elevated by conveyor 18, will continue to pass upwardly and because of the retarding action of the vines, will be torn therefrom. As the potatoes reach the uppermost end of conveyor 18, the same will fall on to conveyor 24 and the vines which have been torn therefrom will continue to pass upwardly and around the upwardly curved end of panel 54 to drop behind tractor 10 and away from the conveyor 24. This same action obviously takes place with respect to any weeds or other extraneous growth and since the dirt from the dug potatoes has been shaken off by the links 30 and 32 of the respective conveyors, these potatoes will move into their containers virtually clean and ready for subsequent shipment.

It is well known that as share 16 excavates the potatoes and surrounding soil, large chunks of earth are oftentimes moved on to the conveyor 18 and would normally tend to move against the sprockets 62 and 120 and tend to lodge between conveyor 18 and the chains 58 and 124. This may be eliminated by manipulation of the lever 104 to move yoke 98 up or down to the end that the space between conveyor 18 and the chains 58 and 124 may be varied in accordance with the size of lumps moving on to conveyor 18.

In the drawings and specification, there has been set forth the preferred embodiment of the invention and although specific terms are employed, they are used only in a generic and descriptive sense and not for purposes of limitation, the scope of the invention being set forth by the appended claims.

Having thus described the invention, what is claimed as new and desired to be secured by Letters Patent is:

1. A potato digger adapted for mounting upon and operation by a tractor or the like comprising a frame attached to said tractor; digging means on said frame; a conveyor carried by the frame for receiving the dug potatoes from said digging means; structure joined to the frame for raising and lowering the same to and from a position rendering the digging means operable; mechanism connected with said conveyor for operating the same; and an assembly for removing the vines from said dug potatoes as the same are moved from the digging means by the conveyor, said assembly comprising means above the conveyor for advancing the vines in the direction of travel of said conveyor, means extending along the conveyor for guiding the vines, and yieldable means disposed to hold the vines against the guiding means for retarding the advance of said vines as the potatoes thereon are continuously moved by the conveyor in said direction of travel.

2. A potato digger adapted for mounting upon and operation by a tractor or the like comprising a frame attached to said tractor; digging means on said frame; a conveyor carried by the frame for receiving the dug potatoes from said digging means; structure joined to the frame for raising and lowering the same to and from a position rendering the digging means operable; mechanism connected with said conveyor for operating the same; apparatus on the frame above the conveyor for advancing vines on said dug potatoes in the direction of travel of said conveyor; means above the conveyor for guiding said vines through their path of travel along the conveyor; and means cooperable with said guide means for retarding the advance of said vines whereby the same are removed from the potatoes as the latter are caused to continue to move by the conveyor, said last mentioned means comprising a plurality of resilient members adapted to press the vines against the guide means as the same move therealong.

3. A potato digger adapted for mounting upon and operation by a tractor or the like comprising a frame attached to said tractor; digging means on said frame; a conveyor carried by the frame for receiving the dug potatoes from said digging means; structure for raising and lowering the frame to and from a position rendering the digging means operable; operating mechanism for said conveyor; an endless chain extending longitudinally along said conveyor and having fingers thereon for advancing vines on said dug potatoes away from the digging means; and means for retarding the advance of said vines whereby the same are removed from the potatoes as the latter are caused to continue to move by the conveyor, said retarding means comprising a member having a plurality of spaced resilient arms and a guide panel for said vines, said member and said panel being co-extensive with the conveyor and converging as the ends thereof opposite to said digging means are approached.

4. A potato digger adapted for mounting upon and operation by a tractor or the like comprising a frame attached to said tractor; digging means on said frame; a conveyor carried by the frame for receiving the dug potatoes from said digging means; structure for raising and lowering the frame to and from a position rendering the digging means operable; operating mechanism for said conveyor; an endless chain extending longitudinally along said conveyor and having fingers thereon for advancing vines on said dug potatoes away from the digging means; and means for retarding the advance of said vines whereby the same are removed from the potatoes as the latter are caused to continue to move by the conveyor, said retarding means comprising a member having a plurality of spaced resilient arms and a guide panel for said vines, said member and said panel being coextensive with the conveyor and converging as the ends thereof opposite to said digging means are approached, said ends of the member and the panel extending laterally beyond the proximal end of said conveyor for depositing the vines separately from the potatoes.

5. In a potato digger adapted for mounting upon a tractor or the like, a frame swingably attached to said tractor; digging means on said frame; a conveyor carried by the frame for receiving the dug potatoes from said digging means; structure joined to the frame for swinging the same to and from a position rendering the digging means operable; a shiftable assembly carried by the frame and swingable therewith for removing the vines from said dug potatoes as the same are moved from the digging means by the conveyor, said assembly having parts spaced above the conveyor and adjacent the digging means for guiding the vines thereinto; and means joined to said parts for shifting the same relative to the frame to and from predetermined positions above the conveyor.

6. In a potato digger of the kind described, a conveyor for moving dug potatoes to a container therefor; a potato vine removing assembly having a pair of spaced apart endless chains, each having lateral fingers thereon for moving the vines inwardly from one end of the conveyor as the chains are driven; supporting structure for the chains mounted for vertical shifting movement above said end of the conveyor, one of said chains being coextensive with the conveyor, the other chain being relatively short; and a series of arms for holding the vines against said one chain, said arms extending from said short chain.

7. In a potato digger of the kind described, a conveyor for moving dug potatoes to a container therefor; a potato vine removing assembly having a pair of spaced apart endless chains, each having lateral fingers thereon for moving the vines inwardly from one end of the conveyor as the chains are driven; supporting structure for the chains mounted for vertical shifting movement above said end of the conveyor, one of said chains being coextensive with the conveyor, the other chain being relatively short; and a series of arms for holding the vines against said one chain, said arms extending along the conveyor and the one chain from said short chain and being formed from resilient material for retarding the speed of advance of the vines, whereby the vines and potatoes are separated as the potatoes are moved by the conveyor at a speed greater than the speed of the vines.

OTHO A. CLARK.

REFERENCES CITED

The following references are of record in the file of this patent:

UNITED STATES PATENTS

| Number | Name | Date |
|---|---|---|
| 968,432 | Stoker | Aug. 23, 1910 |
| 1,443,741 | Heath | Jan. 30, 1923 |
| 1,592,962 | Sample | July 20, 1926 |

FOREIGN PATENTS

| Number | Country | Date |
|---|---|---|
| 21,828 | Great Britain | of 1906 |
| 27,075 | Denmark | Jan. 10, 1921 |
| 441,246 | Germany | Feb. 25, 1927 |
| 685,514 | Germany | Dec. 19, 1939 |
| 700,243 | Germany | Dec. 16, 1940 |